United States Patent
Hahnlen

(10) Patent No.: US 11,192,333 B2
(45) Date of Patent: Dec. 7, 2021

(54) EMBEDDED METAL TRANSITION FOR JOINING FIBER REINFORCED POLYMERS AND METALLIC STRUCTURES

(71) Applicant: HONDA MOTOR CO., LTD., Tokyo (JP)

(72) Inventor: Ryan M. Hahnlen, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 131 days.

(21) Appl. No.: 16/171,147

(22) Filed: Oct. 25, 2018

(65) Prior Publication Data

US 2020/0130323 A1     Apr. 30, 2020

(51) Int. Cl.
| | | |
|---|---|---|
| B32B 7/02 | (2019.01) | |
| B33Y 10/00 | (2015.01) | |
| B32B 15/02 | (2006.01) | |
| B32B 15/18 | (2006.01) | |
| B32B 7/08 | (2019.01) | |
| B32B 15/08 | (2006.01) | |
| B33Y 80/00 | (2015.01) | |

(52) U.S. Cl.
CPC ............... *B32B 7/02* (2013.01); *B32B 7/08* (2013.01); *B32B 15/02* (2013.01); *B32B 15/08* (2013.01); *B32B 15/18* (2013.01); *B32B 2307/30* (2013.01); *B33Y 10/00* (2014.12); *B33Y 80/00* (2014.12)

(58) Field of Classification Search
None
See application file for complete search history.

(56) References Cited

U.S. PATENT DOCUMENTS 4,489,123 A * 12/1984 Schijve .................. B64C 1/12
                                                              428/213
4,786,837 A * 11/1988 Kalnin .................. B06B 1/0688
                                                              310/330

(Continued)

FOREIGN PATENT DOCUMENTS

| CN | 105458256 A | 4/2016 |
|---|---|---|
| DE | 10 2016 202 755 A1 | 8/2017 |
| KR | 10-1668955 B1 | 10/2016 |

OTHER PUBLICATIONS

CompositesWorld, Lightning strike protection strategies for composite aircraft Tried-and-true materials thrive, but new approaches and new forms designed to process faster are entering the marketplace. Lightning strike protection strategies for composite aircraft | CompositesWorld, as accessed on Mar. 26, 2021, (6 Pages Total) Retrieved from Url: https://www.compositesworld.com/articles/lightning-strike-protection-strategies-for-composite-aircraft.

*Primary Examiner* — Devang R Patel
(74) *Attorney, Agent, or Firm* — Arent Fox LLP

(57) ABSTRACT

A method for making a joint structure including embedding a portion of at least two layers of a third component into a first component and interleaving at least one layer of a second component with an unembedded portion of the at least two layers of the third component, wherein the third component inhibits galvanic corrosion between the first and second components, the first component has a first CTE, the second component has a second CTE that is different from the first CTE, the third component has a third CTE that is between the first CTA and the second CTE, and the third component comprises a mesh component.

17 Claims, 8 Drawing Sheets

(56) References Cited

U.S. PATENT DOCUMENTS

| | | | | |
|---|---|---|---|---|
| 5,160,771 | A | * | 11/1992 | Lambing ............ B29C 66/12821 |
| | | | | 156/157 |
| 5,547,735 | A | * | 8/1996 | Roebroeks ............ B29C 70/088 |
| | | | | 428/110 |
| 5,567,535 | A | * | 10/1996 | Pettit ........................ B64C 1/12 |
| | | | | 428/608 |
| 5,951,800 | A | * | 9/1999 | Pettit .................... B29C 70/088 |
| | | | | 156/157 |
| 7,300,693 | B2 | * | 11/2007 | Albers .................. B29C 70/088 |
| | | | | 428/139 |
| 8,993,084 | B2 | * | 3/2015 | Griess ..................... B29C 66/14 |
| | | | | 428/60 |
| 9,862,140 | B2 | | 1/2018 | Lewicki et al. |
| 2011/0159764 | A1 | * | 6/2011 | Price ....................... B32B 15/14 |
| | | | | 442/228 |
| 2015/0290909 | A1 | * | 10/2015 | Miller ..................... B32B 3/266 |
| | | | | 428/596 |
| 2016/0311051 | A1 | | 10/2016 | Nordman |
| 2016/0333733 | A1 | | 11/2016 | Robertson, Jr. |
| 2017/0291253 | A1 | | 10/2017 | Hahnlen et al. |
| 2018/0126669 | A1 | | 5/2018 | Choi et al. |

\* cited by examiner

EMBEDDED METAL TRANSITION FOR JOINING FIBER REINFORCED POLYMERS AND METALLIC STRUCTURES

TECHNICAL FIELD

The present disclosure is directed to joint structures comprising fiber reinforced polymers (FRPs) and metallic materials.

BACKGROUND OF THE DISCLOSURE

Current methods for making joint structures comprising FRPs and metallic materials involve several drawbacks.

For example, current methods for joining FRPs and metallic materials generally involve mechanical fasteners and/or adhesives to achieve load transfer between the two joined components. However, the inclusion of mechanical fasteners to a cured FRP composite requires cutting or punching a hole into the composite material, resulting in fractures and cracks in the matrix as well as the fibers that serve as stress concentrators. These processes, therefore, weaken the component.

When mechanical fasteners are molded into the composite during curing, the fastener is permanently fixed in place, making integration into a factory assembly line difficult due to the resulting tight tolerance in fastener placement.

When adhesives are used, the joint strength is fully dependent on the lower of either the adhesive strength or composite matrix strength. The fiber reinforcements are not directly engaged in the load path, creating a weak point in the system.

In addition to the above, close proximity of FRPs to metallic materials also poses a galvanic corrosion concern, for example, if FRP and/or fibers thereof are embedded within the metallic material. In particular, carbon fiber serves as the noble or cathodic material in a galvanic couple with metals, potentially resulting in severe corrosion damage when exposed to an electrolyte such as road spray or salt water.

BRIEF DESCRIPTION OF THE DISCLOSURE

The present disclosure is directed to a method for making a joint structure comprising a first component having a first coefficient of thermal expansion (CTE) and a second component having a second CTE that is different from the first CTE using a third component having a third CTE, wherein the third component inhibits galvanic corrosion between the first and second components. According to some aspects, the first component may comprise a metallic component and the second component may comprise a FRP. According to some aspects, the third component may comprise one or more mesh components at least partially embedded within the first component. The present disclosure is also directed to a joint structure comprising the first component, the second component, and the third component as described herein.

DETAILED DESCRIPTION OF THE DISCLOSURE

Figure 1:
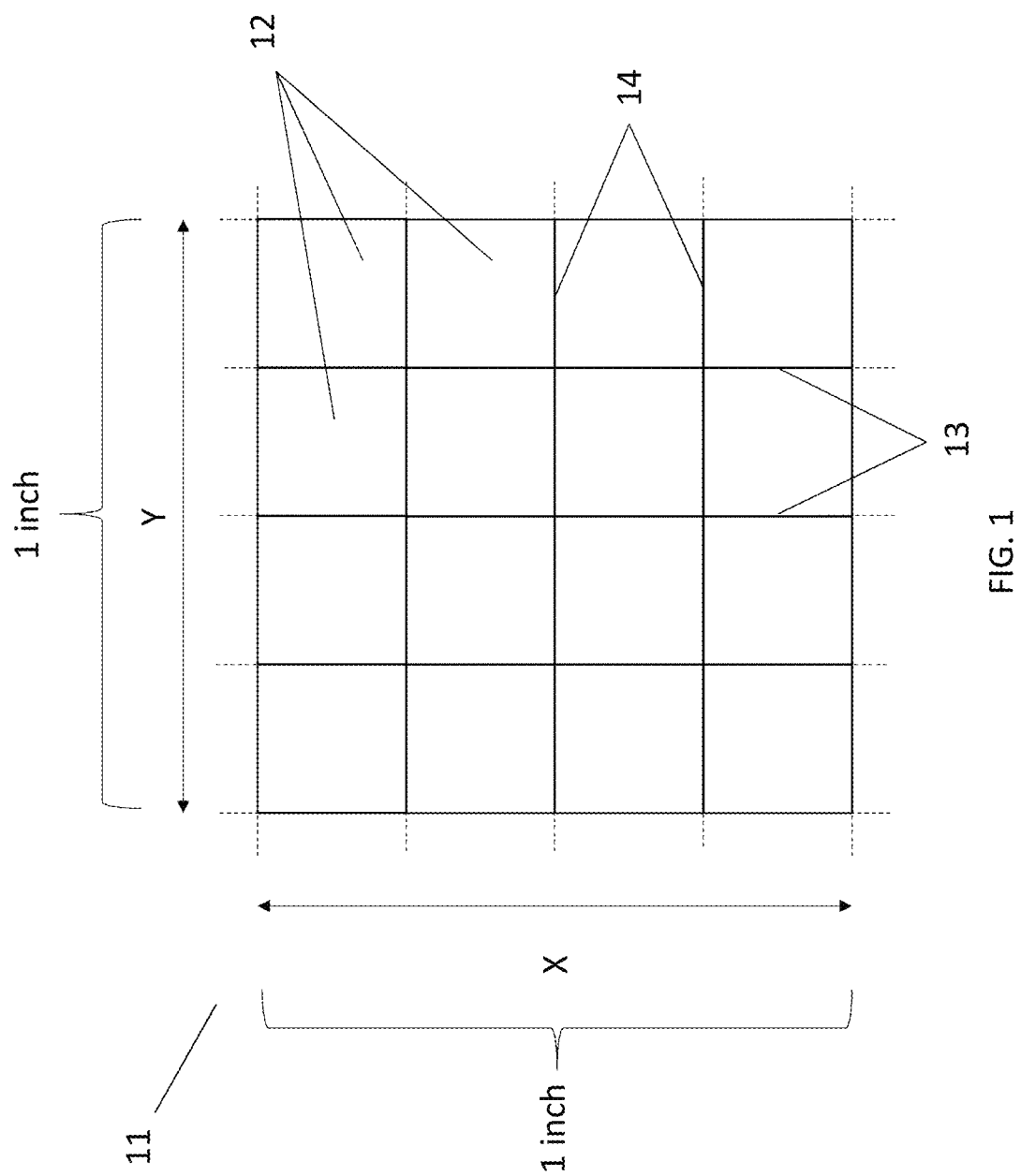
FIG. 1 shows an example mesh material according to aspects of the present disclosure.

The present disclosure is directed to a method for making a joint structure comprising a first component having a first CTE and a second component having a second CTE that is different from the first CTE using a third component having a third CTE. According to some aspects, the first component may comprise a metallic component and the second component may comprise a FRP. According to some aspects, the third component may comprise one or more mesh components at least partially embedded within the first component. The present disclosure is also directed to a joint structure comprising the first component, the second component, and the third component as described herein.

According to some aspects, the first component may comprise a metallic material. Examples of metallic materials according to the present disclosure include, but are not limited to, steel, stainless steel, aluminum, magnesium, titanium, cobalt, beryllium, nickel, columbium, tantalum, tungsten, alloys thereof, and mixtures thereof, or other structural alloys. According to some aspects, the metallic material may be any metallic material suitable for use in or as a vehicle component. As used herein, the term "vehicle" refers to a machine capable of moving by means of power obtained from any form of energy. The term "vehicle" includes, but is not limited to, cars, trucks, vans, minivans, SUVs, motorcycles, scooters, boats, personal watercraft, submersibles, aircraft, and spacecraft.

According to some aspects, the first component may have a first CTE. As used herein, the term "CTE" or "coefficient of thermal expansion" refers to the fractional change in size of a material or component per degree change in temperature at a constant pressure when the material or component is free to expand. According to some aspects, the first CTE may be at least about 15 ppm/° C., optionally at least about 16 ppm/° C., optionally at least about 17 ppm/° C., optionally at least about 18 ppm/° C., optionally at least about 19 ppm/° C., optionally at least about 20 ppm/° C., optionally at least about 21 ppm/° C., optionally at least about 22 ppm/° C., optionally at least about 23 ppm/° C., optionally at least about 24 ppm/° C., optionally at least about 25 ppm/° C., optionally at least about 26 ppm/° C., optionally at least about 27 ppm/° C., optionally at least about 28 ppm/° C., optionally at least about 29 ppm/° C., and optionally at least about 30 ppm/° C. According to some aspects, the first CTE may be from about 5 ppm/° C. to about 23 ppm/° C., optionally from about 6 ppm/° C. to about 22 ppm/° C., optionally from about 7 ppm/° C. to about 21 ppm/° C., optionally from about 8 ppm/° C. to about 20 ppm/° C., optionally from about 9 ppm/° C. to about 19 ppm/° C., optionally from about 10 ppm/° C. to about 18 ppm/° C., and optionally from about 11 ppm/° C. to about 17 ppm/° C.

According to some aspects, the first component may have a first elastic modulus. As used herein, the term "elastic modulus" refers to a material's resistance to non-permanent deformation when a stress is applied to it. According to some aspects, the first elastic modulus may be between about 1 and 300 GPa, optionally between about 1 and 250 GPa, optionally between about 1 and 200 GPa, optionally between about 1 and 100 GPa, optionally between about 1 and 50 GPa, and optionally between about 50 and 100 GPa.

In some variations, the second component may comprise one or more FRPs. As used herein, the term "FRP" or "fiber reinforced polymer" refers to a composite material comprising a polymer matrix reinforced with fibers. Examples of fibers according to the present disclosure include, but are not limited to, fiberglass fibers, carbon fibers, aramid fibers, basalt fibers, and combinations thereof. Examples of polymer matrixes according to the present disclosure include, but are not limited to, epoxy polymers, vinylester polymers, polyester thermosetting plastic polymer, thermoplastic polymers, and combinations thereof.

According to some aspects, the second component may have a second CTE that is different from the first CTE. For example, according to some aspects, the second CTE may be no more than about 10 ppm/° C., optionally no more than about 9 ppm/° C., optionally no more than about 8 ppm/° C., optionally no more than about 7 ppm/° C., optionally no more than about 6 ppm/° C., optionally no more than about 5 ppm/° C., optionally no more than about 4 ppm/° C., optionally no more than about 3 ppm/° C., optionally no more than about 2 ppm/° C., optionally no more than about 1 ppm/° C., optionally no more than about 0.5 ppm/° C., optionally no more than about 0.1 ppm/° C., and optionally no more than about 0.01 ppm/° C.

Furthermore, the difference between the first CTE and the second CTE may be at least about 10 ppm/° C., optionally at least about 11 ppm/° C., optionally at least about 12 ppm/° C., optionally at least about 13 ppm/° C., optionally at least about 14 ppm/° C., optionally at least about 15 ppm/° C., optionally at least about 16 ppm/° C., optionally at least about 17 ppm/° C., optionally at least about 18 ppm/° C., optionally at least about 19 ppm/° C., optionally at least about 20 ppm/° C., optionally at least about 21 ppm/° C., optionally at least about 22 ppm/° C., optionally at least about 23 ppm/° C., optionally at least about 24 ppm/° C., optionally at least about 25 ppm/° C., optionally at least about 26 ppm/° C., and optionally at least about 27 ppm/° C.

According to some aspects, the second component may have a second elastic modulus. According to some aspects, the second elastic modulus may be at least about 50 GPa, optionally at least about 70 GPa, optionally at least about 100 GPa, optionally at least about 150 GPa, optionally at least about 175 GPa, and optionally at least about 200 GPa.

Further, the first component may be joined to the second component via a third component. According to some aspects, the third component may comprise a mesh material. As used herein, the term "mesh" refers to a structure comprising fibers that are woven or otherwise secured together to form regularly spaced openings therebetween. According to some aspects, a mesh may be characterized in terms of its "mesh count," that is, the number of openings per linear inch in an X and/or Y direction (e.g., parallel with vertical fibers and horizontal fibers, respectively, or vice versa). For example, FIG. 1 shows an example 4×4 mesh according to the present disclosure. As shown in FIG. 1, a 4×4 mesh 11 is a mesh having four openings 12 in one linear inch in the X direction and four openings in one linear inch in the Y direction. It should be understood that an 8×8 mesh would refer to a mesh having eight openings in one linear inch in the X direction and eight openings in one linear inch in the Y direction, a 20×20 mesh would refer to a mesh having twenty openings in one linear inch in the X direction and twenty openings in one linear inch in the Y direction, and so on. According to some aspects, the mesh according to the present disclosure may have a mesh count of about 4×4, optionally about 8×8, optionally about 12×12, optionally about 20×20, optionally about 28×28, optionally about 88×88, and optionally about 90×90. According to some aspects, the mesh according to the present disclosure may have a mesh count of between about 5×5 and about 20×20, optionally between about 10×10 and about 14×14. According to some aspects, the mesh according to the present disclosure may have a mesh count of between about 80×80 and about 100×100, optionally between about 85×85 and about 90×90. According to some aspects, the mesh according to the present disclosure may have a mesh count no more than about 10×10. According to some aspects, the mesh according to the present disclosure may have a mesh count of at least about 28×28. According to some aspects, the mesh according to the present disclosure may have a mesh count of at least about 90×90.

Additionally or alternatively, a mesh may be characterized in terms of the size of its openings. It should be understood that the opening size of a mesh material corresponds to the distance between two adjacent fibers in an X direction 13 and two adjacent fibers in a Y direction 14, for example, as shown in FIG. 1. It should be understood that if the example mesh shown in FIG. 1 comprised fibers having a diameter of approximately zero, openings 12 would have an opening size of about 0.0625 square inches, that is, 0.25×0.25 inches. However, it should also be understood that the distance between two adjacent fibers in an X direction 13 and two adjacent fibers in a Y direction will also correspond to the diameter of the fibers.

There may be preferred mesh counts and wire diameters based on the size and strength of the fibers and the strength and size of the regions in first component that are isolated within a single mesh opening. With the mesh of the third material the partially embedded in the first material, the required force to pull the second material out of the first material may be dependent upon either failure of the mesh fibers or the shear strength of the regions of the first material entrained by the mesh cells. The mesh and fiber size of the third material may be chosen such that the greatest force is required to fail the interlock between the first and third material based upon the strengths of the first and third materials.

There may be preferred mesh counts and wire diameters based on the size of the stitching that holds the relative position of the second and third materials described herein. Openings may be sufficiently large to allow for the stitching carrier, i.e. needle, to pass through the mesh without damage. The mesh may also be sized to allow for flexibility of the mesh fibers should the stitch carrier contact a mesh fiber of the third material.

The mesh may have non-equal mesh numbers in the X and Y directions as defined in FIG. 1. This may be useful to reduce the mass of the third component while maintaining the force required to fail the interlock between the first and third components.

According to some aspects, the third component may comprise a mesh material having a third CTE having a value between the first CTE and the second CTE. For example, according to some aspects, the third CTE may be between about 1 and 25 ppm/° C., optionally between about 1 and 23 ppm/° C., optionally between about 1 and 20 ppm/° C., and optionally between about 10 and 20 ppm/° C.

Examples of mesh materials include, but are not limited to, metals such as gold (Au), platinum (Pt), titanium (Ti), nickel (Ni), iron (Fe), chromium (Cr), alloys thereof, including but not limited to Ni—Fe—Cr alloys, steel, and mixtures thereof. According to some aspects, the mesh material may comprise a metal or alloy having a passivated surface, such as 304 stainless steel. Other examples of mesh materials include, but are not limited to, non-metallic materials such as glass fibers, aramid fibers, polymer fibers such as Dyneema®/Spectra®, basalt fibers, and ceramic materials, and combinations thereof.

According to some aspects, the mesh material may be configured to maintain galvanic compatibility between the third component and the first component in the joint structure and/or between the third component and the second component in the joint structure. As used herein, the term "galvanic compatibility" refers to a relationship between two contacting materials wherein oxidation and/or corrosion of the materials is limited when exposed to an electrolyte solution. According to some aspects, "galvanic compatibility" may refer a difference in anodic index between two materials of no more than about 60 mV, optionally no more about 50 mV, optionally no more than about 40 mV, and optionally no more than about 30 mV. As used herein, an "anodic index" refers to the electrochemical voltage that will be developed between a subject material and gold in the presence of an electrolyte solution. When the third material is metallic or electrically conductive, it may be galvanically compatible with the first and/or second components, preferably both the first and second components, to avoid corrosion amongst any or all of the components. This may also be accomplished if the third component is not electrically conductive such as when the mesh consists of glass fibers, aramid fibers, polymer fibers, basalt fibers, ceramic fibers, and combinations thereof. In such instances the third component may provide galvanic compatibility by electrically isolating the first and second components.

According to some aspects, the third component may have a third elastic modulus. According to some aspects, the third elastic modulus may be at least about 150 GPa, optionally at least about 175 GPa, and optionally at least about 200 GPa. According to some aspects, the third elastic modulus may be greater than the first elastic modulus such that the third component may be embedded into the first component without the use of pre-formed channels, as described herein. It should be understood, however, that the third component may be embedded into the first component with the use of pre-formed channels in some aspects of the present disclosure.

Figure 2:
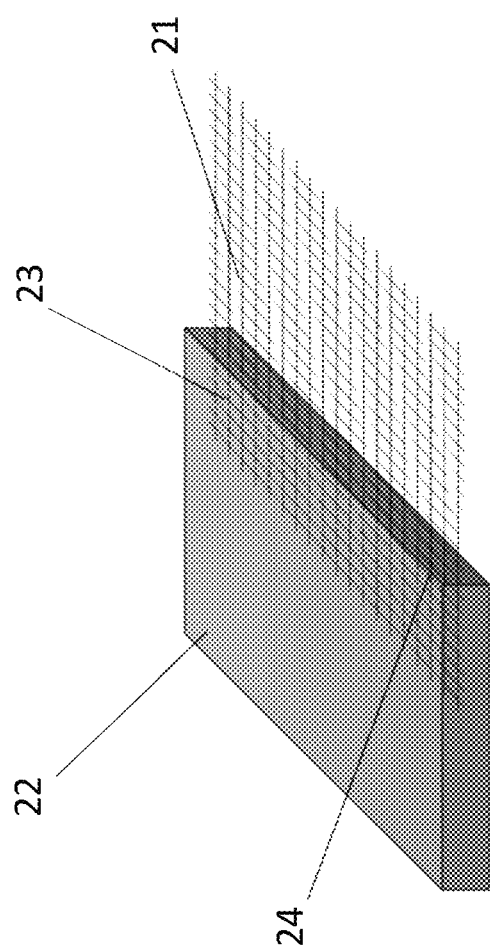
FIG. 2 shows a first component and a third component according to aspects of the present disclosure.

As shown in FIG. 2, the method of the present disclosure may comprise embedding at least a portion 23 of the third component 21 into the first component 22. According to some aspects, the first portion 23 of the third component may have a dimension such that at least ten rows of openings in a direction about parallel to an edge 24 of the first component 22 is embedded, optionally at least nine rows of openings, optionally at least eight rows of openings, optionally at least seven rows of openings, optionally at least six rows of openings, optionally at least five rows of openings, optionally at least four rows of openings, optionally at least three rows of openings, optionally at least two rows of openings, and optionally at least one row of openings. It should be understood that while FIG. 2 shows one layer of the third component 21, the method may comprise embedding two or more layers of the third component 21 into the first component 22. For example, according to some aspects, the method may comprise embedding at least two layers of the third component, optionally at least three layers, optionally at least four layers, optionally at least five layers, optionally at least ten layers, and optionally at least twenty layers. It should be understood that the two or more layers of the third component may comprise identical mesh materials or may comprise different mesh materials as described herein.

According to some aspects, the embedded portion 23 of the third material 21 may be embedded into the first component 22 via an ultrasonic additive manufacturing (UAM) technique and/or other suitable metal additive manufacturing techniques, including but not limited to casting, cold spray, roll bonding, and combinations thereof. Furthermore, the embedded portion 23 of the third component 21 may be embedded into the first component 22 via a direct embedding process. As used herein, the term "direct embedding process" refers to a process wherein one material is embedded into another material without the use of pre-formed channels. It should be understood that the direct embedding process may comprise any of the techniques for embedding as described herein.

Figure 3A:
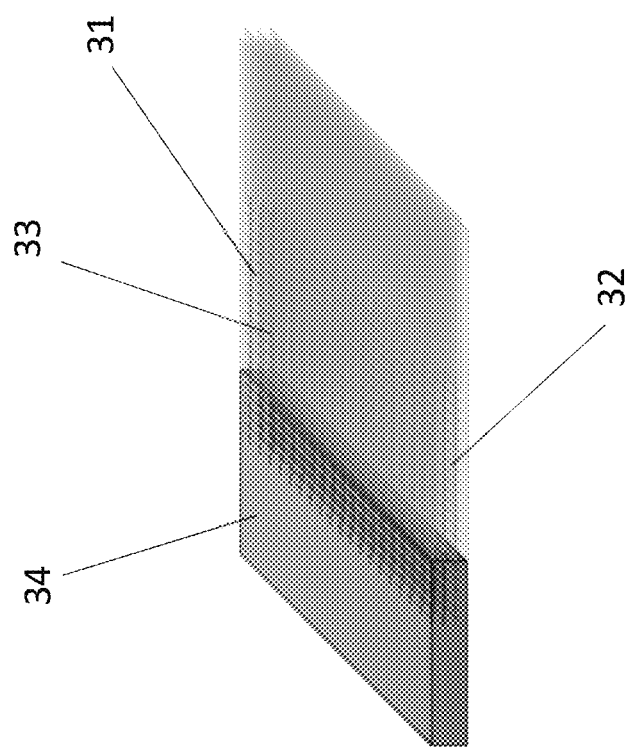
FIG. 3A shows a first component, a second component, a third component, and a fourth component according to aspects of the present disclosure.

As shown in FIG. 3A, the method may comprise interleaving the second component with the third component. For example, as shown in FIG. 3A, one or more layers of the second component 31 may be interleaved with the unembedded portion 32 of the one or more layers of the third component 33, that is, the portion of the one or more layers of the third component 33 that has not been embedded into the first component 34. According to some aspects, the one or more layers of the second component 31 may substantially abut an edge of the first component 34 when interleaved with the one or more layers of the third component.

According to some aspects, the method may comprise interleaving at least two layers of the second component with the one or more layers of the third component, optionally at least three layers, optionally at least four layers, optionally at least five layers, optionally at least ten layers, and optionally at least twenty layers. It should be understood that two or more layers of the second component may comprise identical materials or may comprise different materials as described herein.

According to some aspects, interleaving the second component with the third component may comprise providing one layer of the second component between two adjacent layers of the third component. It should be understood, however, that more than one layer of the second component may be interleaved between two adjacent layers of the third component.

Figure 3B:
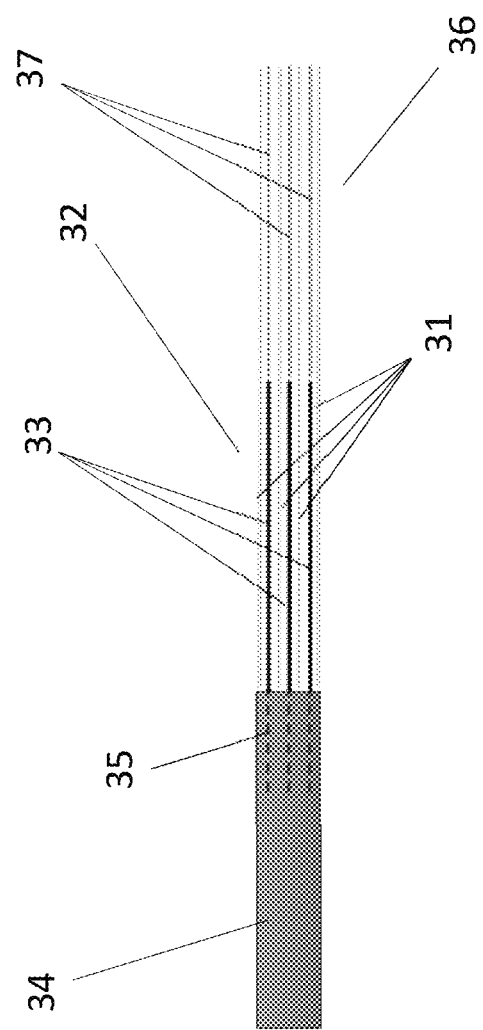
FIG. 3B shows a profile view of a first component, a second component, a third component, and a fourth component according to aspects of the present disclosure.

FIG. 3B shows a profile view of the example aspect shown in FIG. 3A. As shown in FIG. 3B, an embedded portion 35 of the one or more layers of the third component 33 may be embedded into the first component 34 as described herein. In addition, one or more layers of the second component 31 may be interleaved with the unembedded portion 32 of the one or more layers of the third component 33.

It should be understood that the dimensions of the one or more layers of the second component 31 may be configured to substantially match the dimensions of the unembedded portion 32 of the one or more layers of the third component 33. Alternatively, the one or more layers of the second component 31 may extend past an edge of the one or more layers of the third component 33. For example, in the example shown in FIG. 3B, each of the one or more layers of the second component 31 comprise an extending portion 36 interleaved with one or more layers of a fourth component 37. According to some aspects, the one or more layers of the fourth component 37 may substantially abut the one or more layers of the third component 33. The one or more layers of the fourth component may comprise, for example, any of the materials as described herein for use in the second component.

Figure 3C:
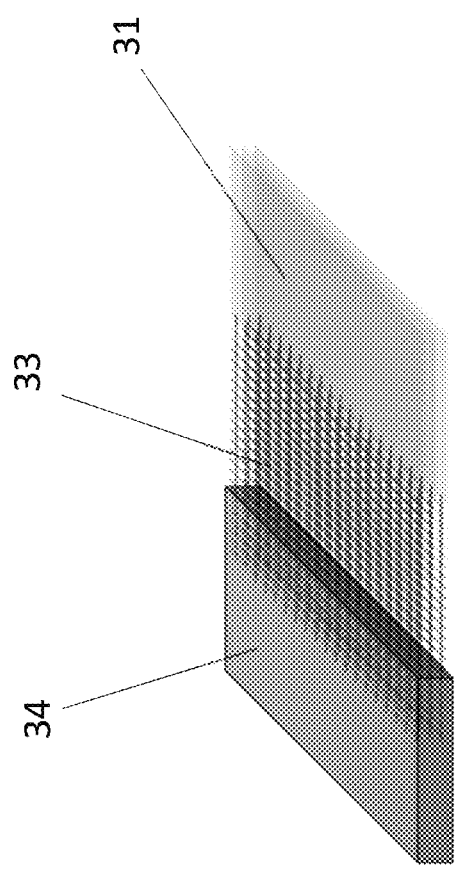
FIG. 3C shows a first component, a third component, and a fourth component according to aspects of the present disclosure.
Figure 3D:
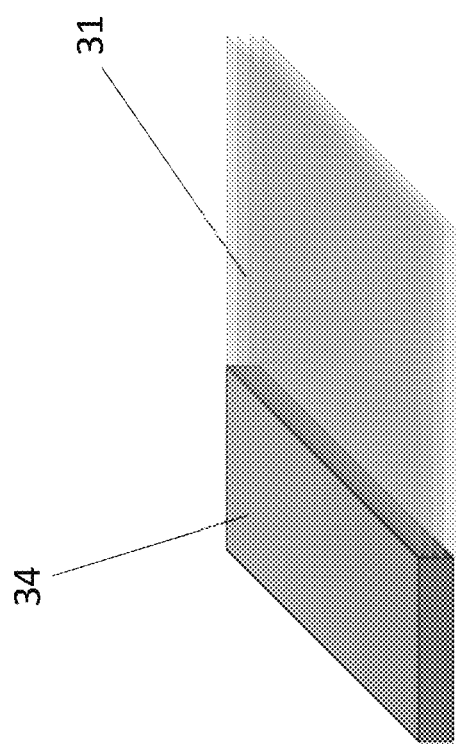
FIG. 3D shows a first component and a second component according to aspects of the present disclosure.

For visualization, FIG. 3C shows the first component 34, one or more layers of the third component 33, and one or more layers of the fourth component 37 without one or more layers of the second component 31. FIG. 3D shows the first component 34 and one or more layers of the second component 31 without one or more layers of the third component or one or more layers of the fourth component.

Figure 3E:
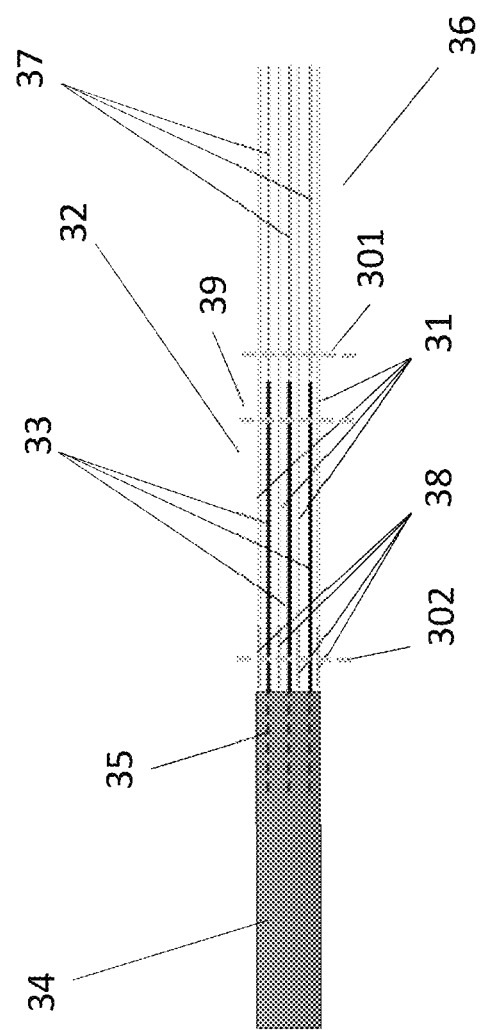
FIG. 3E shows a profile view of a first component, a second component, a third component, a fourth component, and a fifth component according to aspects of the present disclosure.

As shown in FIG. 3E, a fifth component 38 may be used in the plane of any or all layers of the second component 31 to abut against the first 34 and second 31 components, thereby physically separating the first component 34 and the second component 31 sufficient to prevent electrical contact via electrolyte solution bridging between the first 34 and second 31 components. The fifth component 38 may comprise an electrically non-conducting FRP material such as glass fibers, aramid fibers, polymer fibers, basalt fibers, ceramic fibers, and combinations thereof. The dimensions of the fifth component may be sufficient to prevent electrical contact via electrolyte solution bridging between the first 34 and second 31 components. According to some aspects the width of the fifth component 38 may be at least about 3 mm, optionally at least 4 mm, and optionally at least 5 mm.

Figure 4:
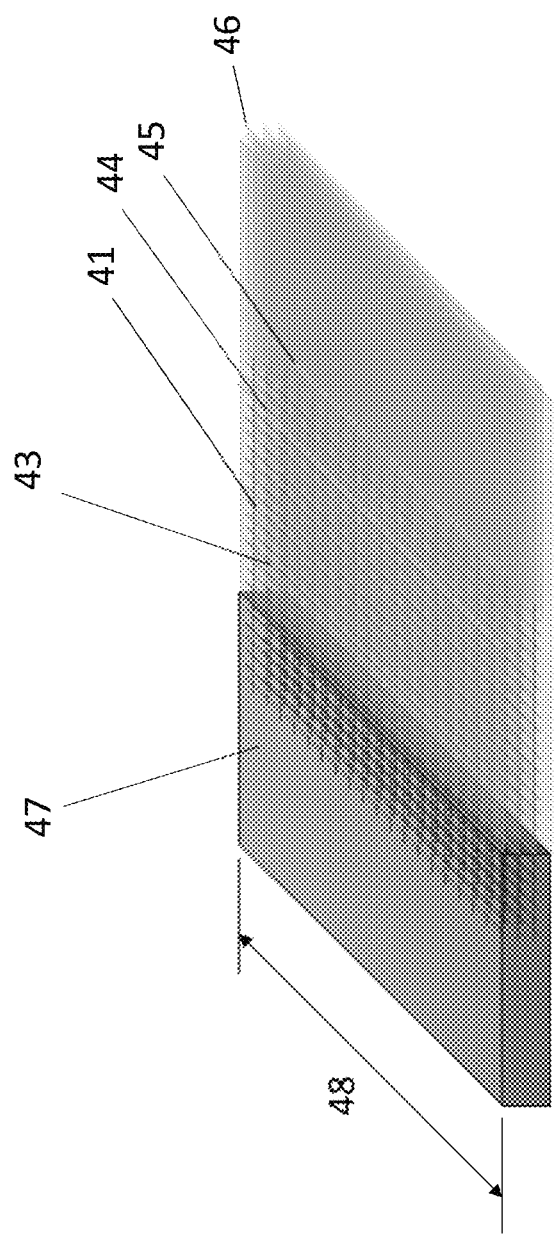
FIG. 4 shows a first component, a second component, a third component, a fourth component, and stitching according to aspects of the present disclosure.

According to some aspects, the method may comprise stitching together the interleaved one or more layers of the second component and one or more layers of the third component. For example, as shown in FIG. 4, one or more stitches 44 may be used to secure the one or more layers of the third component 43 with the one or more layers of the second component 41. Additionally, one or more stitches 45 may be used to secure the one of more layers of the second component 41 to the fourth component 46. When present, one or more layers of the fifth component 38 (FIG. 3E) may be secured to the third component 33 (FIG. 3E) with one or more stiches 302 (FIG. 3E). According to some aspects, the one or more stitches 44, 45 (FIG. 4), 302 (FIG. 3E) may provide strength to the interface between the one or more layers of the third component 43 and the one or more layers of the second component 41, the one or more layers of the second component 41 and the one or more layers of the fourth component 46, and the one or more layers of the fifth component 38 and the one or more layers of the third component 33 (FIG. 3E). Additionally or alternatively, the one or more stitches may at least in part secure the relative positions of one or more layers of the third component 43, the one or more layers of the second component 41, the one or more layers of the fourth component 46, and the one or more layers of the fifth component 38 (FIG. 3E) when present prior to curing. According to some aspects, the one or more stitches 44, 45, 302 (FIG. 3E) may span an entire length of one or more of the components as described herein, for example, an entire length 48 of the first component 47. It should be understood that the stitching may be optimized based on the strength required and/or the desired processing time. Examples of materials useful for the one or more stitches include, but are not limited to, polymer yarns and/or fibers compatible with one or more components as described herein, including polyethylene yarns and/or fibers.

According to some aspects, the method may comprise curing the first component, one or more layers of the second component, one or more layers of the third component, and optionally one or more layers of the fourth component.

It should be understood that according to some aspects, use of the third component as described herein may provide reduced thermal stresses between the first component and the second component when compared with stresses observed in similar joint structures that do not comprise the third component as described herein. This effect may be due at least in part to the nature of the third component, particularly its CTE, the value of which is between the CTE of the first component and the CTE of the second component. In addition, by using a third component having a CTE as descried herein, the difference in thermal strain and resulting stresses during the composite curing process, downstream processes (such as welding and painting), and in an end-use environment may also be reduced when compared with stresses observed in similar joint structures that do not comprise the third component as described herein.

The present disclosure is also directed to a joint structure comprising the first component, the second component, the third component, optionally the fourth component, and optionally the fifth component that may be provided by the methods as described herein. For example, according to some aspects, the joint structure may comprise a first component embedded with at least a portion of one or more layers of a third component. The unembedded portion of the one or more layers of the third component may be interleaved with one or more layers of a second component. The joint structure may be stitched or unstitched as described herein and/or uncured or cured as described herein.

When assembled, the second component, the third component, optionally the fourth component, and optionally the fifth component may all or individually consist of their dry fiber constituents or a "prepreg" form factor where "prepreg" is a fiber based fabric that is impregnated with uncured resin to be cured once layup is complete. Following the assembly process which involves interleaving the second component, the third component, optionally the fourth component, and optionally the fifth component as present and stitching as described herein, the FRP portions of the component is cured using traditional FRP processes such as vacuum assisted resin transfer molding, autoclaving, or high pressure resin transfer molding. During the curing process, a mold release, masking agent, or similar coating may be applied to the first component to prevent resin from curing on the surfaces the first component. This may allow for joining of the metallic first component to other metallic components through solid-state or fusion welding methods including resistance spot welding, friction stir welding, laser welding, metal inert gas welding, tungsten inert gas welding, and shielded metal arc welding.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

As used herein, the term "about" and "approximately" and "substantially" are defined to being close to as understood by one of ordinary skill in the art. In one non-limiting embodiment, the term "about" and "approximately" are defined to be within 10%, preferably within 5%, more preferably within 1%, and most preferably within 0.5%.

The invention claimed is:

1. A method for making a joint structure comprising:
   embedding a portion of at least two layers of a third component into a first component via an additive manufacturing technique; and
   interleaving at least one layer of a second component with an unembedded portion of the at least two layers of the third component, wherein:
   the first component comprising a first material having a first CTE,
   the second component comprising a second material having a second CTE that is different from the first CTE,
   the third component comprising a third material having a third CTE that is between the first CTE and the second CTE, wherein the third material is different from the first material, and
   the third component comprises a mesh component.

2. The method according to claim 1 wherein the first material comprises a metallic material.

3. The method according to claim 2, wherein the metallic material is selected from the group consisting of steel, aluminum, magnesium, titanium, cobalt, beryllium, nickel, columbium, tantalum, tungsten, alloys thereof, and mixtures thereof.

4. The method according to claim 1, wherein the second material comprises a fiber reinforced polymer.

5. The method according to claim 1, wherein the third material comprises a metal selected from the group consisting of gold, platinum, titanium, nickel, iron, chromium, alloys thereof, and mixtures thereof.

6. The method according to claim 5, wherein the third material comprises steel, stainless steel, and/or alloys and/or mixtures thereof.

7. The method according to claim 1, wherein the mesh component is electrically non-conductive.

8. The method according to claim 1, wherein the first CTE is at least about 15 ppm/° C. and the second CTE is no more than about 10 ppm/° C.

9. The method according to claim 1, wherein the mesh component has a mesh count of at least 28x28.

10. The method according to claim 1, wherein the mesh component is galvanically compatible with the first component and/or the second component.

11. The method according to claim 1, wherein embedding the portion of the at least two layers of the third component into the first component comprises an ultrasonic additive manufacturing technique.

12. The method according to claim 1, wherein embedding the portion of the at least two layers of the third component into the first component is performed by a direct embedding process.

13. The method according to claim 1, further comprising stitching together the interleaved at least one layer of the second component and the at least two layers of the third component.

14. The method according to claim 13, further comprising curing the first component, the second component, and the third component after stitching.

15. The method according to claim 1, wherein the method further comprises:
   interleaving at least two layers of the second component with the unembedded portion of the at least two layers of the third component, and
   interleaving at least one layer of a fourth component with the at least two layers of the second component.

16. A method for making a joint structure comprising:
   embedding a portion of at least two layers of a third component into a first component via an additive manufacturing technique; and
   interleaving at least one layer of a second component with an unembedded portion of the at least two layers of the third component,
   wherein the third component comprises a mesh component that is galvanically compatible with the first component and/or the second component,
   wherein the first component comprises a first material, the second component comprises a second material, and the third component comprises a third material that is different from the first material.

17. The method according to claim 16, wherein the second component is not embedded in the first component.

* * * * *